No. 844,688. PATENTED FEB. 19, 1907.
F. P. PFLEGHAR.
DIE AND PATTERN MAKING MACHINE.
APPLICATION FILED APR. 7, 1902.

5 SHEETS—SHEET 1.

Witnesses
Henry Thieme
George Barry Jr.

Inventor
Frank P. Pfleghar
By Brown & Seward
his Attorneys

No. 844,688. PATENTED FEB. 19, 1907.
F. P. PFLEGHAR.
DIE AND PATTERN MAKING MACHINE.
APPLICATION FILED APR. 7, 1902.

5 SHEETS—SHEET 3.

Witnesses:
Henry Thieme
George Barry Jr

Inventor
Frank P. Pfleghar
By Brown & Seward
his Attorneys

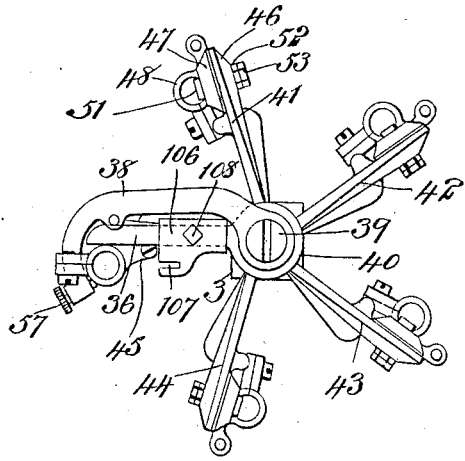
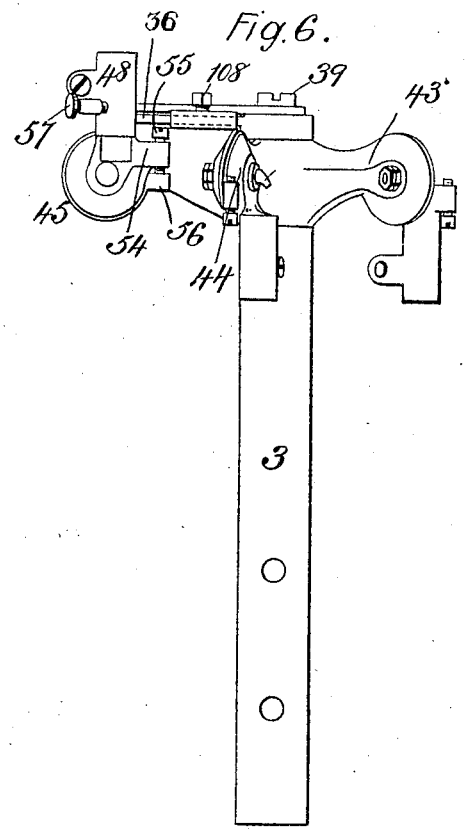

No. 844,688. PATENTED FEB. 19, 1907.
F. P. PFLEGHAR.
DIE AND PATTERN MAKING MACHINE.
APPLICATION FILED APR. 7, 1902.
5 SHEETS—SHEET 5.
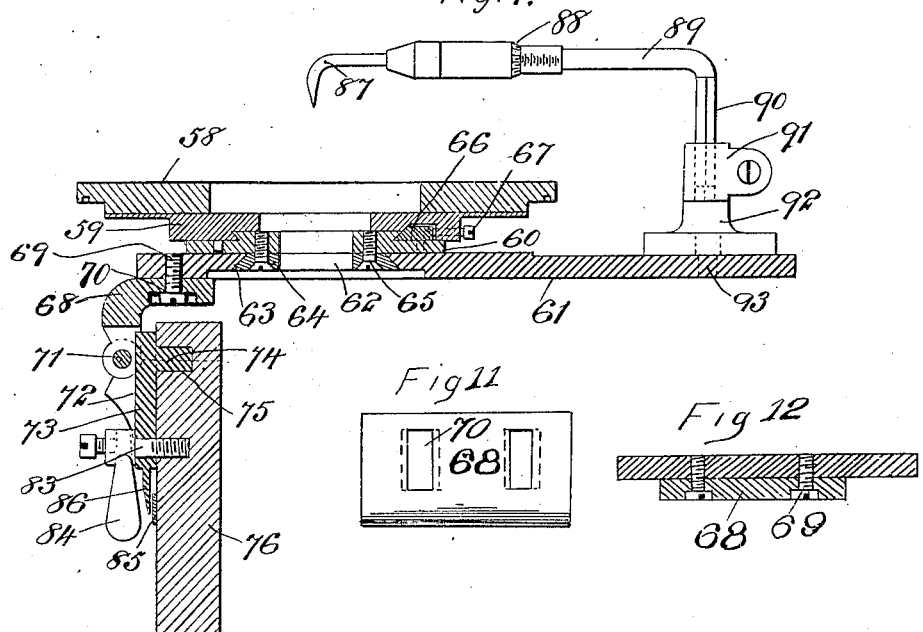
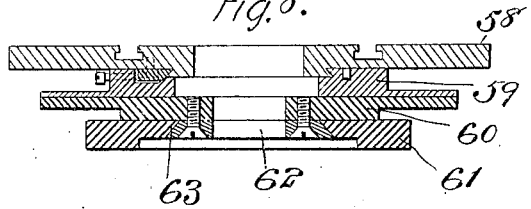
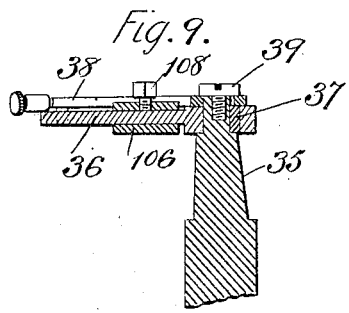
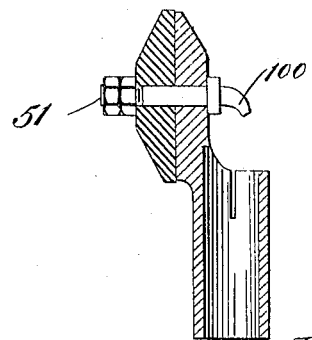
Witnesses:
Henry Thieme
George Barry Jr.
Inventor
Frank P. Pfleghar
By Brown & Seward
his Attorneys

UNITED STATES PATENT OFFICE.

FRANK P. PFLEGHAR, OF NEW HAVEN, CONNECTICUT.

DIE AND PATTERN MAKING MACHINE.

No. 844,688.  Specification of Letters Patent.  Patented Feb. 19, 1907.

Application filed April 7, 1902. Serial No. 101,747.

*To all whom it may concern:*

Be it known that I, FRANK P. PFLEGHAR, a citizen of the United States, and a resident of New Haven, in the county of New Haven and State of Connecticut, have invented a new and useful Die and Pattern Making Machine, of which the following is a specification.

My invention relates to a die and pattern making machine, with the object in view of providing a machine which will accurately cut a die or pattern up to the mark whatever its shape may be.

It has hitherto been common to cut a die or pattern up to the mark by means of a file in the hands of the operator, and no matter how skilled the operator and with what care he may use the tool there has been a constant tendency for the file to rock as it is reciprocated and the mark which is being worked up to, being in many instances partially concealed by the file, has been slightly overreached, so that the absolute accuracy which is desirable in fine work of this character has only been approximated to.

My present invention provides for accurately accomplishing by means of a machine what has heretofore been commonly attempted by hand.

Figure 1:
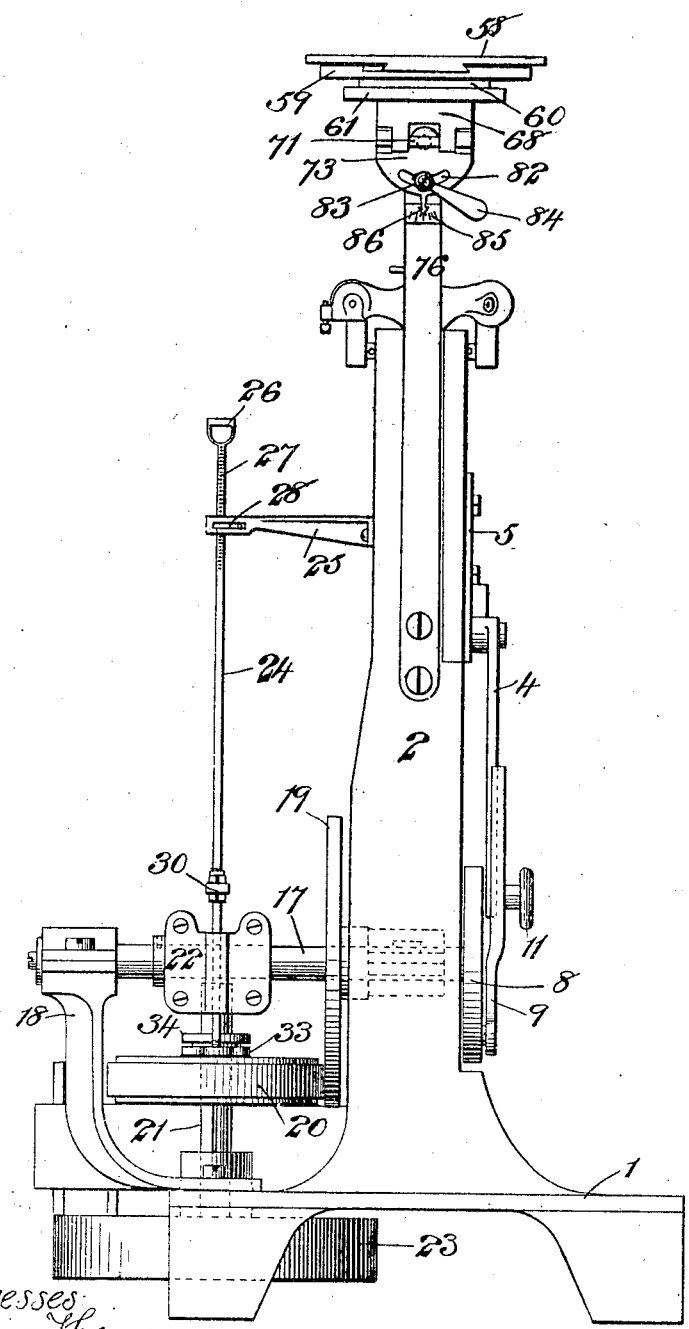
Figure 2:
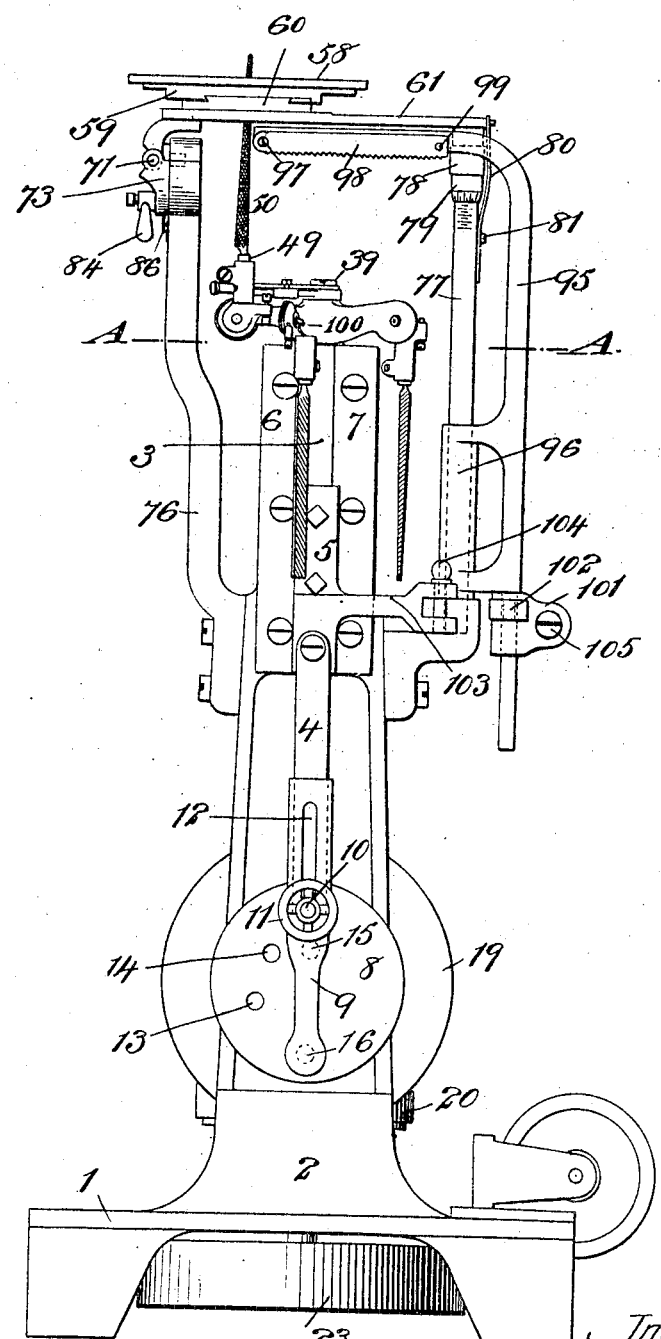
Figure 3:
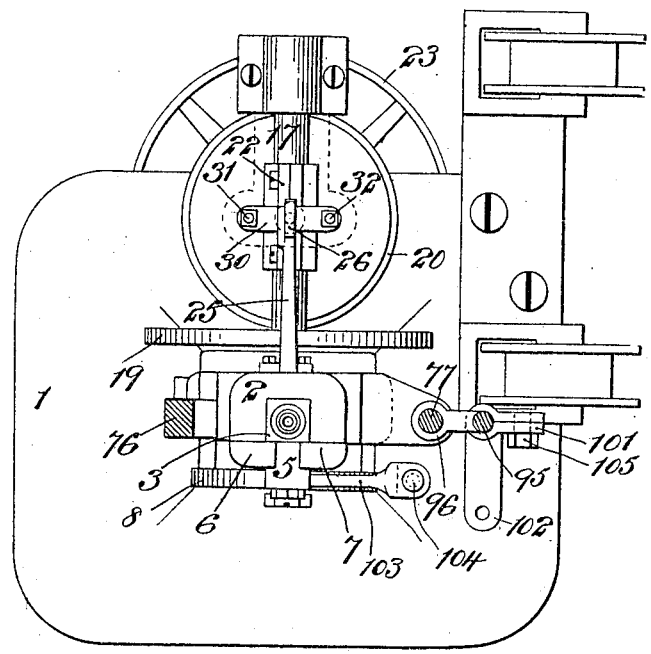
Figure 4:
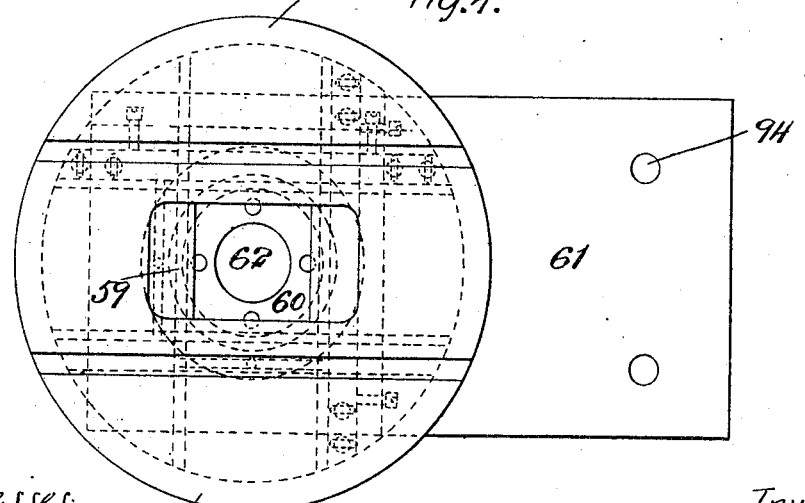

In the accompanying drawings, Figure 1 is a view of the machine in front elevation, the indicator at the top of the table being removed. Fig. 2 is a view of the same in side elevation, showing different forms of files secured in their sockets. Fig. 3 is a horizontal section taken in the plane of the line A A of Fig. 2. Fig. 4 is a top plan view of the table and its immediate supports. Fig. 5 is an enlarged top plan view of the rotary cutter-holder and its support. Fig. 6 is a view of the same in side elevation. Fig. 7 is an enlarged vertical section through the table and its several supports, showing the indicator for centering the work in position thereon. Fig. 8 is a vertical section through the table and its supports in a plane at right angles to the section represented in Fig. 7. Fig. 9 is a vertical section through the top of the cutter-holder support and the adjusting-arms connected therewith. Fig. 10 is a vertical section through one of the cutter-holder sockets and the end of the arm from which it depends, showing the means for attaching and detaching the end of a saw; and Figs. 11 and 12 show, respectively, in detail a top plan view of the hinge-piece for supporting the main table and a sectional view in detail taken vertically through the hinge-piece and table in the plane of the line B B of Fig. 7.

The base of the supporting-frame is denoted by 1. A supporting-standard 2 uprises from the base 1 and forms a support for the vertically-reciprocating slide 3, (see Figs. 2 and 3,) which is connected with the pitman 4 by means of a connecting-piece 5, projecting rearwardly between the face-pieces 6 and 7 and bolted to the slide 3.

The pitman 4 is connected with the crank-wheel 8 by means of a rod 9, which has a sliding engagement with the pitman 4, the two being held in the proper adjustment by means of a set-screw 10, operated by hand-wheel 11 and working in an elongated slot 12, formed in the rod 9.

The crank-wheel 8 is provided with perforations 13 14 15 16, in the present instance four, located at unequal distances from the center of the crank-wheel, in any one of which perforations the end of the rod 9 may be connected to the crank-wheel in order to increase or diminish the throw of the slide 3.

While I have shown four perforations in the crank-wheel for this purpose, it is obvious that the number may be increased or diminished at pleasure to suit the various adjustments which might be required.

The crank-wheel 8 is fixed to rotate with a shaft 17, mounted in the standard 2 and in a bracket 18, uprising from the base 1, the bracket 18 being spaced from the standard 2 to permit the introduction of a friction drive, as follows: On the shaft 17 there is a wheel 19, against the face of which the friction drive-pulley 20 presses. The drive-pulley 20 is fixed to rotate with the drive-shaft 21, mounted at one end in a bearing 22, hung on the shaft 17, and at its opposite end in the base 1, the said drive-shaft 21 being provided beneath the top of the base 1 with a drive-wheel 23, which is intended to be connected by a belt with a suitable source of power. (Not shown.)

The friction-pulley 20, while connected with the shaft 21 to rotate therewith, is arranged to slide up and down along the shaft 21 by the ordinary spline connection and is operated as follows: An operating-rod 24 has a vertically-sliding movement in the outer end of an arm 25, fixed to the standard 2. The said operating-rod 24 is provided at its upper end with a handle 26 and is held in different vertical adjustments by any well-known or approved device. The lower end of the rod 24 is connected with a yoke 30, (see Fig. 3,) the said rod being connected with the yoke 30 in such a manner that it may be turned in the yoke, and the opposite ends of the yoke 30 are connected by rods 31 and 32 with the opposite ends of a yoke 33, which loosely surrounds the hub of a friction-wheel 20.

The yoke 33 is locked in position on the hub of the wheel 20 by means of a collar 34, which is fixed to the hub of the wheel 20 in any suitable manner—as, for example, by screws—so that while the wheel 20 is free to turn together with the shaft 21 within the yoke 33 the latter when lifted will by its engagement with the collar 34, fixed to the hub of the wheel 20, slide with the friction-wheel 20 along the shaft 21 to bring the driving-face of the wheel 20 nearer to or farther away from the center of the wheel or disk 19 to increase or decrease the rotary movement of the wheel 19, and hence of the shaft 17 and crank-wheel 8.

The wheel 20 may be at any time thrown out of gear with the wheel 19 by simply sliding it down far enough to throw it out of engagement with the face of the wheel 19.

The operating-rod 24 may be slid up and down freely by simply turning it far enough to bring the catch-spring 28 against the smooth part of the rod and may be locked in position by simply turning it back again where the spring will engage the teeth 27.

The cutters which I have illustrated in connection with the machine are files and a saw. I wish, however, to have it understood that I do not limit myself to files and saws, but intend to use any cutters which may be suitable for the purposes in hand.

The cutter-holder which I have shown and which I find it feasible to use contains five arms, each provided with a socket for holding a file or other suitable cutter. The number of arms, however, may be increased or diminished at pleasure.

Referring to Figs. 5 and 6, the slide hereinbefore referred to forms a support for the cutter-holder and consists of a bar rectangular in cross-section and having its upper end (see Fig. 9) rounded and tapered, as shown at 35, to receive the hub of the cutter-holder and to permit the latter to be rotated thereon. The upper end of the tapered part 35 is still further reduced to form a seat for an arm 36, extending at right angles to the slide and held against a rotary movement by means of a feather or spline 37. The extreme upper end of the part 35 is still further provided with a horizontally-swinging locking-arm 38, held in position on the part 35 by means of a set-screw 39.

The hub of the cutter-holder is denoted by 40 and its several arms radiating horizontally from the hub by 41, 42, 43, 44, and 45.

The several arms 41 to 45, inclusive, are quite similar in structure, so that the description of one will suffice for the description of all. Take, for example, the arm 41. It is preferably formed comparatively thin in a horizontal direction and deep in a vertical direction to give it the necessary strength for operating the tool, and at its outer end it is provided with a flat-faced disk 46, against which the face of a disk 47 engages, the latter carrying a split socket 48 for the purpose of receiving and clamping therein the shank or handle 49 of a file 50 or other cutting-tool, as clearly shown in Fig. 2. The disk 47 is pivotally secured to the disk 46 to permit the socket 48 (see Fig. 6) to be swung up into position for use or to drop down out of the way by means of a pivotal bolt 51, provided with a nut and jam-nut 52 and 53, so that the two faces of the disks may be drawn toward one another and held in firm frictional contact to hold the socket in its upright position, with the tool therein, when the tool on any particular arm is required for use.

Each socket is provided with an arm or lug 54, (see Fig. 6,) extending laterally therefrom, and each arm or lug is provided with an adjusting-screw 55, the free end of which screw is in position to engage a lug 56 on the side of the arm on the holder when the socket 48 is in the required position to hold the tool.

By turning the screw 55 the socket 48, and hence the tool held thereby, may be adjusted to a position exactly parallel with the axis of motion of the slide 3, so that the tool will be reciprocated without the slightest rocking movement with respect to the work being cut.

The arm 36, fixed with relation to the slide 3, is located in position to bring that arm of the holder which is to carry the tool for the time being in use in such position that the tool will occupy a predetermined relation to the work-support to be hereinafter described.

The arm so used for holding the tool in use is swung with its upturned socket against the face of the arm 36, as shown in Fig. 6, and is locked in that position, as shown in Figs. 5 and 6, by means of the swinging arm 38, which after the cutter-holder arm with its upturned socket is swung against the face of the arm 36 is swung past the outer face of the socket—as, for example, the socket 48, Fig. 6—and the screw 57, carried in the end of the arm 38, is then advanced, holding the socket tightly between it and the face of the arm 36 while the tool is in use.

The table on which the work to be operated upon immediately rests is denoted by 58. The table 58 has a forward-and-backward sliding movement in a supporting-plate 59 by means of a dovetailed connection, (shown clearly in Fig. 1,) while the supporting-plate 59 has a laterally-sliding movement on a supporting-plate 60, with which it has a dovetailed connection, as clearly shown in Fig. 2. The table 58 and plates 59 and 60 have open centers.

The supporting-plate 60, together with the parts above it, has a rotary movement in a plate 61, as clearly shown in Fig. 7. For this purpose the plate 61 is provided with a circular opening 62, registering with the open centers of the plates 60 59 and the table 58, and having its walls undercut, as at 63, for the reception of a beveled-edge ring 64, the beveled edge of which fits the undercut edge 63 of the opening 62, the ring 64 itself being secured to the supporting-plate 60 by means of several screws 65.

The dovetailed connection of the supporting-plate 59 with the supporting-plate 60, as well as the dovetailed connection of the support 58 with the plate 59, is made by means of sliding gibs 66 under the control of set-screws 67 for the purpose of taking up lost motion and wear.

The plate 61 is secured at its front end to a hinge-piece 68 by means of screws shown at 69, Fig. 7, the said screws 69 being received in an elongated slot 70, formed in the hinge-piece 68 and also shown in Fig. 7, to permit the plate 61 and parts carried thereby to be adjusted toward the front and rear to a slight degree in order to center the face of the cutting-tool in the opening 62.

The hinge-piece 68 is connected by a hinge-pintle 71 with a hinge-piece 72, fixed to or formed integral with a rocking plate 73. The plate 73 is provided near its upper end with a stub-axle 74, which is received in a socket 75, formed in a standard 76, fixed to and uprising from the front of the main standard 2.

The rear end of the supporting-plate 61 rests, when the plate is in position for use, on the top of a standard 77, fixed to and uprising from the rear of the main standard 2. The standard 77 is provided with an adjustable top section 78, its connection with the body of the standard 77 being made by a micrometer-nut 79 in order to determine the exact horizontal or tilted position of the plate 61 and parts carried thereby.

The tilt of the plate 61, so far as the adjustment of the nut 79 is concerned, will be, if there be any, toward the front or toward the rear, this tilt being in certain instances desirable for the purpose of giving clearance to the die being cut by making its lower edge or the edge opposite that which determines the shape of the article recede slightly from the vertical plane of the edge which determines the shape of the article.

The plate 61 is locked in its position on the head of the standard 77 by means of a spring-strap 80, the upper end of which is connected with the rear end of the plate 61 and the lower end of which is provided with an elongated slot of ordinary construction, (not shown,) through which a set-screw 81 extends into the standard 77, so that the plate 61 may be lifted or lowered by loosening the screw 61 and permitting the strap 80 to slide on the screw, and the plate may then be locked in its adjusted position by turning home the screw 81.

The table 61 may be given a tilt laterally in either direction by means of an arc-shaped slot 82, formed in the lower end of the hinge-piece or hinge-piece support 73, through which there extends a set-screw 83 into the standard 76, the said set-screw being provided with a handle 84 for turning it.

In connection with the swinging hinge-piece or hinge-piece support 73 there is a scale-plate 85, fixed to the front of the standard 76, over which a pointer 86, depending from the hinge-piece support 73, travels to indicate the exact amount of tilt of the plates 61 and the parts carried thereby in a lateral direction. This adjustment is utilized in connection with the work on the sides of the die or work being cut when for any cause it is desired to make the wall of the cut oblique to the plane of the face of the plate being operated upon.

For the purpose of locating or centering the die-plate to be cut where the operator is called upon to cut in the arc of a circle I provide an indicator 87, having a micrometer adjustment at 88 with its supporting-arm 89, on which it may be slid, together with its micrometer adjustment, bodily forward and backward, the said arm being provided with an upright portion 90, fixed in a split socket 91 on a base 92, the said base 92 being provided with depending pins 93 (indicated in dotted lines, Fig. 7) for entering perforations 94 (see Fig. 4) in the plate 61 for the purpose of adjusting the indicator in position for use and conveniently removing it from the plate 61 when it is not required.

The particular use of the indicator 87 is as follows: In order to bring the work to be cut in the arc of a circle into engagement with the cutter having its face at the center of the opening 62, it is important that the center of that arc which is to be cut on the work shall be located in the forward and rearward central line of the opening 62 or in the plane of that line extended, and to this end, the center having been indicated on the plate to be worked upon and that plate having been laid upon the table 58, the position of its center will be directly beneath the point of the indicator 87, the latter having been adjusted back from the center of the opening 62 a distance corresponding to the radius of the arc to be cut.

For the purpose of using a cutting-tool of such thickness and stiffness as to require a support at its upper as well as its lower ends-- as, for example, a saw--I provide a cutter-holder consisting of a rod 95, provided with a sleeve 96, embracing the standard 77 and capable of being slid up and down on the standard 77 and of being rocked on the standard 77.

The upper end of the rod 95 is turned horizontally and is provided at its free end, as at 97, with means for attaching thereto one end of a saw 98.

When the saw is not in use, it may be laid alongside of the horizontal portion of the standard, as shown in Fig. 2, and held in its position by means of a suitable fastening through the hole 99 in the lower end of the saw; but when the saw is to be employed in the place of one of the files or other cutting-tool carried by the arms of the cutter-holder, hereinabove explained, the holder 95 may be rocked on its support to bring its free end out from beneath the plate 61, and the support may then be slid upwardly on the standard 77, bringing its horizontal portion above the table with its free end centrally over the opening 62. The lower end of the saw may then be detached from its support and passed downwardly through the opening 62 and engage the hooked end 100 of the clamping-bolt 51, (see Fig. 10,) and when so adjusted the spring-clip 101 on the lower end of the support 95 may be swung to bring its perforated lug 102 between the upper and lower jaws of the laterally-extended arm 103, fixed to the connecting-piece 5, with which the pitman is engaged, and a pin 104 may be passed through the jaws of the arm 103 and through the perforated lug 102 on the support 95 and the spring-clip then brought into snug frictional contact with the support 95 by the screw 105 to lock the support 95 to the arm 103 and cause it to reciprocate, together with the slide 3, to impart a reciprocatory movement to the saw.

The end of the saw is held in engagement with the hook 100 on the end of the clamping-bolt 51 by means of a slide 106 on the arm 36, (see Figs. 5 and 6,) which slide is provided with a slot 107 for receiving the back of the saw and with a set-screw 108 for locking the slide to the arm 36 when it has been slid outwardly into engagement with the saw.

When the saw is used, the arm 38 is thrown backwardly out of the way and the socket for containing the file or other cutting-tool is dropped downwardly out of the way.

In operation, the work having been placed on the table 58 and secured in position by means of suitable clamps or other fastening devices and the particular one of several files or other cutting-tool having been adjusted into position to reciprocate within the opening 62 through the table and the subsupports and the table and its subsupports having been adjusted into a horizontal position or with a forward and backward or lateral tilt, as the case may be, the machine is set in motion by pulling up on the handle of the operating-rod, and the work is then presented to the cutting-tool by the combined forward and rearward and laterally-sliding movements of the table, as well as the rotary movement of the table, so as to bring the cutting-face of the tool into the position to work the die or pattern with absolute accuracy up to the line indicated.

The tilting feature of the support in the various directions is an important feature, as it not only serves to provide for the necessary and accurate degree of clearance throughout the entire cut, but it enables the operator to bring the cutting-tool into sharp angles with the greatest delicacy and without liability of overcutting and damaging the die or pattern.

The machine is comparatively simple in its structure and its adjustments are such as to render it efficient whatever be the peculiar shape of the die or pattern.

While I have referred to the machine as a die and pattern cutting machine, its uses are much more universal than would be indicated by the title, and I wish it to be understood that other uses than those indicated by the title are contemplated.

It is obvious that changes might be resorted to in the form and arrangement of the several parts without departing from the spirit and scope of my invention. Hence I do not wish to limit myself strictly to the structure herein set forth; but

What I claim as new, and desire to secure by Letters Patent, is—

1. In combination, a work-supporting table provided with an opening therethrough, a cutter-holder located below the opening in the table, a swinging and vertically-sliding cutter-holder arranged to be swung and slid from a position beneath the table into a position above the opening in the table, means for connecting the two cutter-holders to move simultaneously and means for operating the cutter-holders.

2. In combination, a work-supporting table provided with an opening therethrough, a hinged plate forming a support for the table, means for adjusting the hinged plate on its hinge, means for rocking the hinge bodily and means for supporting and operating a cutter.

3. In combination, a work-support, a multiple-armed cutter-holder mounted in rotary adjustment beneath the work-support, cutter-holder devices attached to the arms and arranged to be turned up into operative position or down out of operative position, means for locking the cutter-holder in rotatable adjustment with any one of the cutter-carrying arms into operative position beneath the work-support and means for reciprocating the cutter-holder and hence the cutters carried thereby.

4. In combination, a work-support, a multiple-armed cutter-holder mounted in rotary adjustment beneath the work-support, cutter-holding socket-pieces attached in swinging adjustment to said arms, means for locking the said socket-pieces in operative position and for permitting the said sockets to swing out of operative position, means for locking the cutter-holder with any one of the cutter-holding socket-pieces in operative position beneath the work-support and means for reciprocating the cutter-holder and hence the cutters carried thereby.

5. In combination, a work-support, a multiple-armed cutter-holder mounted in rotary adjustment beneath the work-support, a vertically-reciprocating slide on which the cutter-holder is mounted, a laterally-extended arm fixed to said slide and means for locking the cutter-holder to said arm to hold the cutter in operative position.

6. In combination, a work-support, a multiple-armed cutter-holder located beneath the work-support, a vertically-reciprocating slide on which the cutter-holder is mounted to rotate, a laterally-extended arm fixed to said slide and a horizontally-swinging arm mounted on said slide for locking the cutter-holder to the said arm in operative adjustment.

7. In combination, a work-support, a multiple-armed cutter-holder, tool-holding sockets pivoted to the arms of the cutter-holder, the said arms of the cutter-holder and the sockets being provided the one with a bearing-lug and the other with an adjusting-screw in position to engage the lug for the purpose of arresting the socket in position to hold the tool in operative adjustment and means for reciprocating the tool-holder.

8. In combination, a main supporting-frame, a vertically-reciprocating slide mounted in said frame, a tool-holder carried by said slide, standards uprising from said frame and a work-supporting table having a hinge connection with one of said standards and an adjustable section on the other of said standards for rocking the table on its hinged connection.

In testimony that I claim the foregoing as my invention I have signed my name, in presence of two witnesses, this 2d day of April, 1902.

FRANK P. PFLEGHAR.

Witnesses:
C. W. JOHNSON,
JAMES J. CONNOLLY.